Patented Aug. 12, 1952

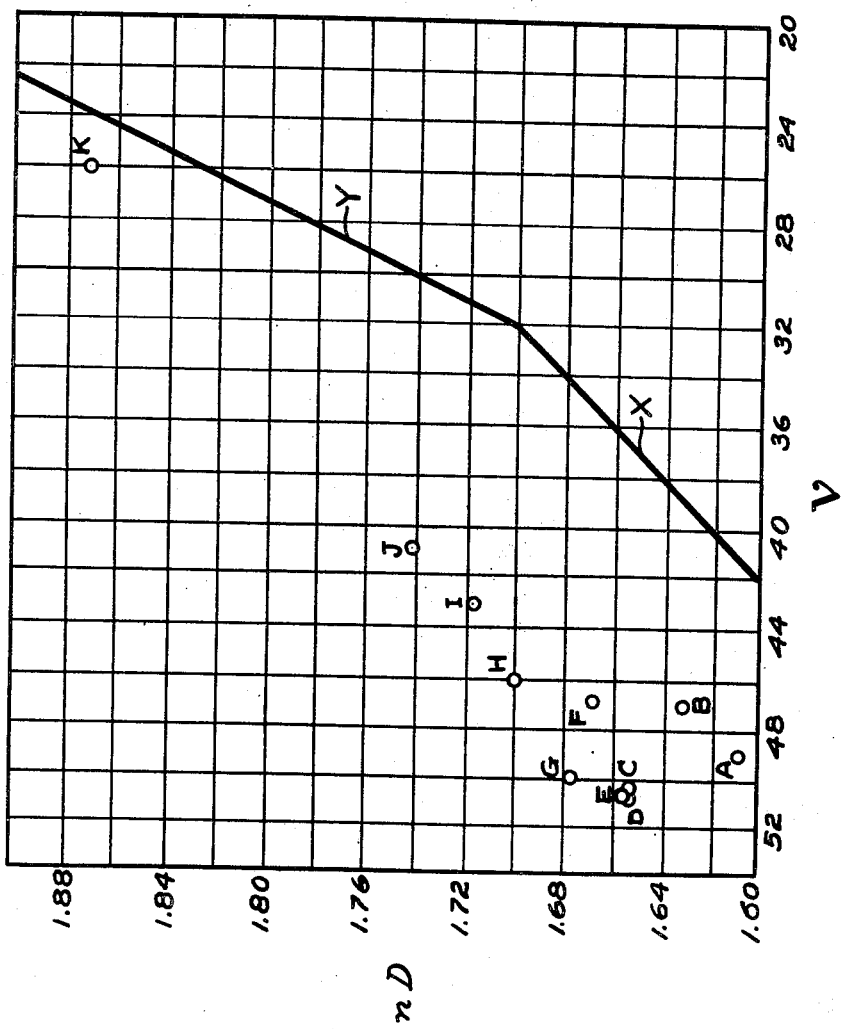

2,606,841

UNITED STATES PATENT OFFICE 2,606,841

OPTICAL GLASS

William H. Armistead, Corning, N. Y., assignor to Corning Glass Works, Corning, N. Y., a corporation of New York Application May 31, 1949, Serial No. 96,285

8 Claims. (Cl. 106—52)

This application is a continuation in part of my pending application Serial No. 627,746 filed November 9, 1945, since abandoned, which in turn is a continuation in part of my application Serial No. 614,288 filed September 4, 1945, now Patent Number 2,435,995, and relates to optical glass compositions which have an index of refraction for the D line ($nD$) greater than 1.60 and which are suitable for use in optical instruments and devices of various kinds.

Heretofore the most common optical glasses having a refractive index greater than 1.60 have been the flint glasses having a high lead content and the dense barium crown glasses. For some purposes it is desirable to use a glass which not only has a refractive index in the range 1.7 to 1.9 but which has also a high dispersive index ($v$) or nu value, as it is sometimes called.

The flint glasses have relatively low dispersive indices which decrease as their lead contents and refractive indices are increased.

The barium crown glasses in general have high dispersive indices, but their refractive indices do not exceed about 1.63 because an increase in the barium content beyond this point, about 50% BaO, results in devitrification of the glass when it is slowly cooled or reheated for molding. Although a barium content of 55–70% BaO was heretofore desirable, it could not be attained without devitrification of the glass.

The primary object of this invention is to provide transparent optical glasses which have refractive indices ($nD$) greater than 1.60 and dispersive indices ($v$) higher than have heretofore been obtainable in the flint glasses.

Another object is to provide barium crown glasses which contain over 50% and up to 70% BaO and which will not devitrify when reheated or slowly cooled.

Another object is to prevent the devitrification of barium glasses having barium contents above 50% BaO.

Another object is to provide glasses which have refractive indices greater than 1.60 and correspondingly high dispersive indices and which have a total of at least 40% BaO and CdO.

I have found that the introduction of substantial amounts of CdO into dense barium crown glasses enables the barium content to be increased to as much as about 70% BaO without devitrification and with a corresponding gain in refractive index. Since CdO also tends to raise the refractive index and to maintain the high dispersive index of the glass, it may also be substituted in large percentages for BaO. Such glasses resist devitrification so well that the cadmium content may be as high as 75% CdO and refractive indices as high as 1.8 may be obtained by thus increasing either the BaO or CdO of the glass. In order that the refractive index shall be at least 1.60, it is necessary that the total BaO and CdO content be not less than 40%, with the minimum amount of each being 3%. The glasses must contain at least one and preferably both of the glass-forming oxides $SiO_2$ and $B_2O_3$, either one or both of which must amount to at least 12% but neither or both of which should exceed about 50%. By the term "glass forming oxide" I mean an oxide which, when molten, can be cooled to form a glass of and by itself.

The new glasses comprise essentially BaO, CdO and either $SiO_2$ or $B_2O_3$ or both $SiO_2$ and $B_2O_3$ in the proportions stated above. Minor amounts of other constituents may also be present in a total up to about 30% without substantial change in the desirable properties of the glasses, subject to the following considerations: The glasses preferably should contain at least one of the refractory oxides $Al_2O_3$ or $ZrO_2$, both of which aid in preventing devitrification. $ZrO_2$ also helps to raise both the refractive index and the dispersive index but should not exceed about 10% on account of its low solubility. $Al_2O_3$ alone may amount to as much as 30%, but must be less when $ZrO_2$ is present in order that the latter may dissolve. The presence of PbO in amounts as high as 30% and/or alkali metal oxide, namely, $Li_2O$, $Na_2O$, $K_2O$ or mixtures thereof, in amounts up to 20% is also advantageous for stability and optical properties. Either alkali metal oxide or $Al_2O_3$, or both, should be present in the absence of $B_2O_3$ to replace the fluxing power of the latter. Other oxides which are commonly used in optical glass compositions such as, for example, BeO, ZnO, $As_2O_3$, $Sb_2O_3$ or $TiO_2$ may also be included in the new glasses, but preferably should not exceed a total of about 5%.

The following glasses, which are given in percent by weight as calculated from their respective batches, show by way of example compositions which I have melted and which fall within the scope of my invention:

|        | A      | B      | C      | D      | E      | F      |
|--------|--------|--------|--------|--------|--------|--------|
| BaO    | 25     | 20     | 44     | 43     | 50     | 25     |
| CdO    | 25     | 20     | 17     | 17     | 12     | 35     |
| PbO    |        |        | 10     |        |        |        |
| $Al_2O_3$ |     | 10     | 15.5   | 10     | 10     | 10     |
| $B_2O_3$ |      | 10     | 23     | 16     | 8      | 15     |
| $SiO_2$ | 40    | 30     |        | 13     | 19     | 15     |
| $K_2O$ | 10     |        |        |        |        |        |
| $Na_2O$ |       |        | .5     | 1      | 1      |        |
| $nD$   | 1.6105 | 1.6323 | 1.6530 | 1.6534 | 1.6538 | 1.6697 |
| $\nu$  | 49     | 47     | 50.3   | 50.7   | 50.6   | 47     |

|        | G      | H      | I      | J      | K      |
|--------|--------|--------|--------|--------|--------|
| BaO    | 40     | 60     | 45     | 45     | 20     |
| CdO    | 25     | 15     | 30     | 30     | 40     |
| PbO    |        |        |        |        | 20     |
| $Al_2O_3$ | 5   | 5      | 5      |        | 2      |
| $B_2O_3$ | 10   | 10     | 10     | 10     | 7      |
| $SiO_2$ | 20    | 10     | 10     | 10     | 7      |
| $TiO_2$ |       |        |        |        | 2      |
| $ZrO_2$ |       |        |        | 5      | 2      |
| $nD$   | 1.6777 | 1.6997 | 1.7179 | 1.7417 | 1.8712 |
| $\nu$  | 50     | 46     | 43     | 41     | 26     |

The above glasses are chemically stable and resistant to devitrification. It will be noted that they have refractive indices greater than 1.60 and relatively high dispersive indices. Glass E is particularly suitable for ophthalmic lenses.

To illustrate the relationship between $nD$ and $\nu$ for the glasses of this invention, reference is had to the accompanying drawing which is a diagram representing the values of $nD$ for the above glasses plotted against their respective values of $\nu$ and designated by the letters of the respective glasses. It will be noted that the values for the various glasses are above the lines X and Y which represent the approximate minima in the values for $nD$ and $\nu$ which characterize the glasses of this invention.

The line X is drawn through the points $(nD=1.60, \nu=42)$ and $(nD=1.70, \nu=32)$ and is defined by the equation $$\nu = 202 - 100nD$$

The line Y is drawn through the points $(nD=1.70, \nu=32)$ and $(nD=1.85, \nu=25)$ and is defined by the equation $$\nu = 111.4 - 46.6nD$$

I claim:

1. A transparent optical glass which comprises essentially 3% to 70% BaO, 3% to 75% CdO, and 12% to 50% of a mixture of $SiO_2$ and $B_2O_3$, the total BaO, CdO, $SiO_2$ and $B_2O_3$ being at least 70%, the total BaO and CdO being at least 40%, and the remainder of the composition comprising compatible oxides, the refractive index ($nD$) being at least 1.60 and the dispersive index ($\nu$) being greater than both $\nu=202-100nD$ and $\nu=111.4-46.6nD$.

2. A transparent optical glass which comprises essentially 3% to 70% BaO, 3% to 75% CdO, and 12% to 50% of a mixture of $SiO_2$ and $B_2O_3$, the total BaO, CdO, $SiO_2$ and $B_2O_3$ being at least 70%, the total BaO and CdO being at least 40%, and $Al_2O_3$ in an amount up to 30%, the remainder of the composition comprising compatible oxides, the refractive index ($nD$) being at least 1.60 and the dispersive index ($\nu$) being greater than both $\nu=202-100nD$ and $\nu=111.4-46.6nD$.

3. A transparent optical glass which comprises essentially 3% to 70% BaO, 3% to 75% CdO, and 12% to 50% of a mixture of $SiO_2$ and $B_2O_3$, the total BaO, CdO, $SiO_2$ and $B_2O_3$ being at least 70%, the total BaO and CdO being at least 40%, and an alkali metal oxide in an amount up to 20% selected from the group consisting of $Li_2O$, $Na_2O$, $K_2O$ and mixtures thereof, the remainder of the composition comprising compatible oxides, the refractive index ($nD$) being at least 1.60 and the dispersive index ($\nu$) being greater than both $\nu=202-100nD$ and $\nu=111.4-46.6nD$.

4. A transparent optical glass which comprises essentially 3% to 70% BaO, 3% to 75% CdO, and 12% to 50% of a mixture of $SiO_2$ and $B_2O_3$, the total BaO, CdO, $SiO_2$ and $B_2O_3$ being at least 70%, the total BaO and CdO being at least 40%, and $Al_2O_3$ in an amount up to 30% and an alkali metal oxide in an amount up to 20% selected from the group consisting of $Li_2O$, $Na_2O$, $K_2O$ and mixtures thereof, the remainder of the composition comprising compatible oxides, the refractive index ($nD$) being at least 1.60 and the dispersive index ($\nu$) being greater than both $\nu=202-100nD$ and $$\nu = 111.4 - 46.6nD$$

5. A transparent optical glass which comprises essentially 3% to 70% BaO, 3% to 75% CdO, and 12% to 50% of a mixture of $SiO_2$ and $B_2O_3$, the total BaO, CdO, $SiO_2$ and $B_2O_3$ being at least 70%, the total BaO and CdO being at least 40%, and PbO in an amount up to 30%, the remainder of the composition comprising compatible oxides, the refractive index ($nD$) being at least 1.60 and the dispersive index ($\nu$) being greater than both $\nu=202-100nD$ and $\nu=111.4-46.6nD$.

6. A transparent optical glass which comprises essentially 3% to 70% BaO, 3% to 75% CdO, and 12% to 50% of a mixture of $SiO_2$ and $B_2O_3$, the total BaO, CdO, $SiO_2$ and $B_2O_3$ being at least 70%, the total BaO and CdO being at least 40%, and PbO in an amount up to 30% and $Al_2O_3$ in an amount up to 30%, the remainder of the composition comprising compatible oxides, the refractive index ($nD$) being at least 1.60 and the dispersive index ($\nu$) being greater than both $\nu=202-100nD$ and $\nu=111.4-46.6nD$.

7. A transparent optical glass which comprises essentially 3% to 70% BaO, 3% to 75% CdO, and 12% to 50% of a mixture of $SiO_2$ and $B_2O_3$, the total BaO, CdO, $SiO_2$ and $B_2O_3$ being at least 70%, the total BaO and CdO being at least 40%, and $ZrO_2$ in an amount up to 10%, the remainder of the composition comprising compatible oxides, the refractive index ($nD$) being at least 1.60 and the dispersive index ($\nu$) being greater than both $\nu=202-100nD$ and $\nu=111.4-46.6nD$.

8. A transparent optical glass which consists approximately of 50% BaO, 12% CdO, 10% $Al_2O_3$, 8% $B_2O_3$, 19% $SiO_2$, and 1% $Na_2O$, on an oxide basis as calculated from the batch and which has a refractive index ($nD$) of approximately 1.653 and a dispersive index ($\nu$) of approximately 50.6.

WILLIAM H. ARMISTEAD.

REFERENCES CITED

The following references are of record in the file of this patent:

UNITED STATES PATENTS

| Number    | Name   | Date         |
|-----------|--------|--------------|
| 2,477,649 | Pincus | Aug. 2, 1949 |